US008145853B2

(12) United States Patent
Kajigaya (10) Patent No.: US 8,145,853 B2
(45) Date of Patent: Mar. 27, 2012

(54) SEMICONDUCTOR MEMORY APPARATUS, MEMORY ACCESS CONTROL SYSTEM AND DATA READING METHOD

(75) Inventor: Kazuhiko Kajigaya, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 605 days.

(21) Appl. No.: 12/149,243

(22) Filed: Apr. 29, 2008

(65) Prior Publication Data
US 2008/0276049 A1     Nov. 6, 2008

(30) Foreign Application Priority Data

May 2, 2007   (JP) ................ P2007-121526

(51) Int. Cl.
*G06F 12/00* (2006.01)
(52) U.S. Cl. .......................... 711/151; 710/40
(58) Field of Classification Search .................. 711/151; 710/40
See application file for complete search history.

(56) References Cited

U.S. PATENT DOCUMENTS

| | | | | |
|---|---|---|---|---|
| 3,949,369 | A | * | 4/1976 | Churchill, Jr. ............ 711/128 |
| 4,965,716 | A | * | 10/1990 | Sweeney ................. 710/112 |
| 5,956,744 | A | * | 9/1999 | Robertson et al. ........ 711/122 |
| 6,216,200 | B1 | * | 4/2001 | Yeager ................... 711/100 |
| 2004/0049638 | A1 | * | 3/2004 | Ashmore et al. .......... 711/136 |
| 2006/0047874 | A1 | * | 3/2006 | Watanabe et al. ......... 710/244 |

FOREIGN PATENT DOCUMENTS

| | | |
|---|---|---|
| JP | 07-200488 | 8/1995 |
| JP | 08-016454 | 1/1996 |
| JP | 11-16388 | 1/1999 |
| JP | 2002-055807 | 2/2002 |
| JP | 2003-076654 | 3/2003 |

OTHER PUBLICATIONS

Korean Office Action dated Nov. 25, 2009, with English Translation.

* cited by examiner

*Primary Examiner* — Hashem Farrokh
(74) *Attorney, Agent, or Firm* — McGinn IP Law Group, PLLC (57) ABSTRACT

In order to provide a semiconductor memory apparatus which can flexibly change the priority of reading requests when the reading request is issued and which do not exclusively use the memory bus, a semiconductor memory apparatus includes: a main memory which stores data at an address while maintaining a corresponding relationship between the data and the address; a read request input portion receiving a read request which maintains a corresponding relationship between address information that is referred to when reading the data and priority information that indicates priority for reading the data; a read data storing portion which stores the data and priority while maintaining a corresponding relationship thereof; a data reading portion reads the data corresponding to address information which is input by the read request input portion from the main memory; a read data registration portion storing both the priority information input by the read request input and the data read by the data reading portion to the read data storing portion while maintaining a corresponding relationship between the priority information and the data read; and a priority operation control portion which chooses and outputs the data with a highest priority among the priority information and the data that are stored in the read data storing portion while maintaining a corresponding relationship between the priority information and the data.

20 Claims, 6 Drawing Sheets

SEMICONDUCTOR MEMORY APPARATUS, MEMORY ACCESS CONTROL SYSTEM AND DATA READING METHOD

BACKGROUND OF THE INVENTION

1. Field of the Invention

The present invention relates to a technique of a semiconductor memory apparatus which is shared by multiple bus masters. In particular, the present invention relates to a memory access control system in which the multiple bus masters reads data from the semiconductor memory apparatus by using random priorities.

Priority is claimed on Japanese Patent Application No. 2007-121526, filed May 2, 2007, the content of which is incorporated herein by reference.

2. Description of the Related Art

In the past, in accordance with approaching steps of increasing the frequency of clocks of a microprocessor as much as possible in order to improve the ability of the microprocessor, fine processings in a semiconductor technology has been developed. As an adverse effect of such a development, the leak current of a transistor has been largely increased, and there is a problem of electric power consumption. Therefore, it has gradually been more difficult to improve the ability of the microprocessor by increasing the frequency of clocks of the microprocessor in the same manner as used in the past. In order to solve such a problem, there is a major solution for improving the ability of the microprocessor without increasing the frequency of clocks of the microprocessor by mounting multiple processor cores on one chip and conducting a distributed processing of tasks.

In a computer system conducting an information processing in parallel by using a CPU (central processing unit) providing such multiple cores, it is necessary to set a priority to each of the reading requests for reading a shared main memory in order to read the requested data at an appropriate time. Otherwise, ability of information processing cannot be improved.

In addition, in order to improve the efficiency of the memory bus between the CPU having the multiple cores and the main memory, it is preferable to control time of reading and writing data so as to avoid blanks or vacancy of data transfer of the memory bus. Therefore, it has been important to improve the flexibility of memory access by controlling both a memory reading request and a transfer request of the read data.

With regard to such a technique, there are the following Patent Documents 1-4. Patent Documents 1 and 2 disclose a memory access adjusting method and a circuit of this method in which if there is a conflict among memory access requests, each request is conducted in an order determined in accordance with the priority of each of the requests.

In addition, Patent Document 3 discloses a technique using a memory integrating apparatus in which a reservation is made when an operation request is accepted from each of the processing units, and a memory accessing means selects the reserved operation request based on the conditions and generates a memory accessing signal. Therefore, in Patent Document 3, each memory accessing operation corresponding to operational requests from the processing units is independently conducted, and conditions of reading/writing operations of one memory requested by the multiple processing units are improved.

Patent Document 4 discloses a technique of a DSP-memory data transmission apparatus applied to an apparatus which provides a CPU and multiple DSP (digital signal processor), and the technique includes: a transmission request selection circuit which receives transmission request signals from the CPU or DSP; and a transmission request maintaining circuit which receives and temporally maintains the transmission request signals and transmits command signals requesting transmission of data in accordance with the priority of the transmission request signal, wherein the DSP-memory data transmission apparatus which is connected to each of the multiple DSP via an expansion bus. The DSP-memory data transmission apparatus of Patent Document 4 further includes: an expansion bus control circuit which receives the command signals, reads transmission information of the CPU or the DSP and transmits data based on the transmission information; and a dual port RAM (random access memory) which maintains transmission data for the CPU, wherein the expansion bus control circuit reads or writes the transmission data stored in the dual port RAM. In accordance with the above-described constitution, Patent Document 4 discloses a technique of using the DSP-memory data transmission apparatus which can conduct data transmission operations between the multiple DSP and the memory by using circuits with simple constitutions.

As described above, control methods of Patent Documents 1-4 are generally known that conduct memory access operations when there is a conflict among reading requests of multiple information processing apparatuses such as CPU.

[Patent Document 1] Japanese Patent Application, First Publication No. H07-200488
[Patent Document 2] Japanese Patent Application, First Publication No. H08-16454
[Patent Document 3] Japanese Patent Application, First Publication No. 2002-55807
[Patent Document 4] Japanese Patent Application, First Publication No. 2003-76654

However, these prior arts have a problem such as a predetermined method of setting the priority, and that is, it is not possible to control the reading requests if the priority is changed every time the reading request is issued.

In addition, these prior arts have an assumption in which a memory access operation is conducted after determining the priority by a memory access control circuit, and the operation is suspended until the corresponding data is received. Therefore, the priors have another problem in which there is a possibility of exclusively using the memory bus from issuing a read request to reception of data.

SUMMARY OF THE INVENTION

The present invention was conceived in order to solve the above-described problems and has an objective to provide a semiconductor memory apparatus, a memory access control system and a data reading method which can flexibly change the priority of reading requests when the reading request is issued and which does not exclusively use the memory bus.

The present invention was conceived to solve the above-described problems and has, for example, the following aspects.

A first aspect is a semiconductor memory apparatus, including: a main memory which stores data at an address while maintaining a correspondence relationship between the data and the address; a read request input portion receiving a read request which maintains a correspondence relationship between address information that is referred to when reading the data and priority information that indicates the priority for reading the data; a read data storing portion which stores both the data and the priority information while maintaining a correspondence relationship between the data and the priority information; a data reading portion reads the data corresponding to the address information which is input by the read request input portion from the main memory; a read data registration portion storing both the priority information input by the read request input and the data read by the data reading portion to the read data storing portion while maintaining a correspondence relationship between the priority information and the data read; and a priority operation control portion which chooses and outputs the data with the highest priority among the priority information and the data that are stored in the read data storing portion while maintaining a correspondence relationship between the priority information and the data.

A second aspect is a semiconductor memory apparatus described in the first aspect, further including a read data transport request input portion which receives a data transport request signal requesting to output the data, wherein the priority operation control portion chooses the data with the highest priority when the read data transport request portion receives the read data transport request.

A third aspect is a semiconductor memory apparatus described in the first or second aspect, wherein the read data storing portion includes: multiple registers which store both the data and the priority information while maintaining a correspondence relationship between the data and the priority information; a read pointer portion which indicates a read address of the multiple registers; a write pointer portion which indicates a write address of the multiple registers; the read data registration portion stores the priority information and the data to the register pointed by the address indicated by the read pointer portion while maintaining a correspondence relationship between the priority information and the data, and the priority operation portion chooses the register with a highest priority among the registers between the address pointed by the write pointer portion and the address pointed by the read pointer portion and reads the data stored in the chosen register.

A fourth aspect is a semiconductor memory apparatus described in the third aspect, wherein, when the priority operation control portion chooses the register with the highest priority among the registers between the address pointed by the write pointer portion and the address pointed by the read pointer portion and reads the data stored in the chosen register, if the priority operation control portion detects multiple registers with the highest priority, the priority operation control portion chooses one of the multiple registers that is closest to the address pointed by the write pointer portion.

A fifth aspect is a semiconductor memory apparatus described in the third or fourth aspects, wherein each of the registers stores a read flag which indicates whether or not the register has been read while maintaining a corresponding relationship between the flag and the priority information, the read data registration portion sets the read flag of the register corresponding to the address pointed by the write pointer portion to "unread" when the read data registration portion stores the priority information and the data to the register pointed by the address indicated by the read pointer portion while maintaining a corresponding relationship between the priority information and the data, and the priority operation control portion sets the read flag of the register with the highest priority to "read" when the priority operation control portion chooses the register with the highest priority and outputs the data stored in the chosen register.

A sixth aspect is a semiconductor memory apparatus described in the fifth aspect, wherein when the priority operation control portion chooses the register with the highest priority among the registers between the address pointed by the write pointer portion and the address pointed by the read pointer portion and reads the data stored in the chosen register, if the priority operation control portion skips the register, the read flag of the register is "read".

A seventh aspect is a semiconductor memory apparatus described in one of the first to sixth aspects, wherein the read request includes storing area identification information which indicates a storing area at which the data which has been read is stored corresponding relationships are maintained between the storing area identification information and the address information and between the storing area identification information and the priority information, the data, the priority information and the storing area identification information are stored at the read data storing portion. The read data registration portion stores the priority information input by the read request input portion, the priority information, the storing area identification information and the data read by the data reading portion at the read data storing portion while maintaining a corresponding relationship thereof. The priority operation control portion chooses and outputs the priority information, the storing area identification information and the data while maintaining a corresponding relationship thereof that have the highest priority and have been stored at the read data storing portion while maintaining a corresponding relationship thereof.

An eighth aspect is a memory access control system which reads data from a semiconductor memory apparatus via a memory access control circuit, wherein the memory access control circuit inputs a read request including: address information which is referred to when the data is read from the semiconductor memory apparatus; priority information which indicates the priority of reading the data; and storing area identification information which is used for determining the storing area of the read data while maintaining a corresponding relationship thereof, and includes a read request transport portion which outputs the read request that has been input. The semiconductor memory apparatus includes: a main memory which stores data at an address while maintaining a corresponding relationship between the data and the address; a read data storing portion which stores the data, priority, and storing area identification information while maintaining a corresponding relationship thereof; a read request input portion receiving a read request from the memory access control circuit; a data reading portion reads the data corresponding to address information included in the read request which is input by the read request input portion from the main memory; a read data registration portion storing the priority information input by the read request input, the data read by the data reading portion and the storing area identification information to the read data storing portion while maintaining a corresponding relationship thereof; and a priority operation control portion which chooses the data and the storing area identification information with a highest priority among the data, the priority and the storing area identification information stored in the read data storing portion and outputs the data and the storing area identification information to the memory access control portion while maintaining a corresponding relationship thereof. The memory access control circuit includes a data storing portion which inputs the data and the storing area identification information from the semiconductor memory apparatus while maintaining a corresponding relationship thereof and stores the data based on the storing area identification information.

A ninth aspect is a memory access control system described in the eighth aspect, wherein the memory access control circuit includes a read data transport request output portion which outputs a read data transport request signal which requests output of the data to the semiconductor memory apparatus. The semiconductor memory apparatus includes a read data transport request input portion which receives a data transport request signal from the memory access control circuit, and the priority operation control portion outputs the data. The storing area identification information to the memory access control circuit when the read data transport request portion receives the read data transport request.

A tenth aspect is a memory access control system described in the eighth or ninth aspect, wherein the data storing portion inputs the data and the storing area identification information from the semiconductor memory apparatus and stores the data based on the storing area identification information in accordance with an inputting order of the data and the storing area identification information.

An eleventh aspect is a memory access control system described in one of the eighth to tenth aspects, wherein the memory access control system includes a storing area memory portion which stores the data while maintaining a corresponding relationship between the data and a storing area address. The memory access control circuit includes an address information storing portion for storing the priority and the storing address while maintaining a corresponding relationship thereof. The read request transport portion stores the priority and the storing address at the address information storing portion while maintaining a corresponding relationship thereof, if the storing area identification information of the read request indicates the storing area memory portion and the storing area address is included in the storing area identification information. If the data storing portion inputs the data and the storing area identification information from the semiconductor memory apparatus and the storing area identification information indicates the storing area memory portion, the data storing portion reads the storing area address with the highest priority from the address information storing portion and stores the data at the storing area memory portion of the storing area address.

A twelfth aspect is a data reading method of a semiconductor memory apparatus which includes a main memory that stores data while maintaining a corresponding relationship between the data at an address, including: a step of inputting a read request including both address information which is referred to when reading the data and priority information which indicates the priority for reading the data while maintaining a corresponding relationship thereof; a step of reading the data corresponding to the address information from the main memory; a step of storing the read data and the priority information at a read data memory portion which stores the data and the priority information while maintaining a corresponding relationship thereof; and a step of choosing and outputting the data with a highest priority among the data and the priority information stored in the read data memory portion.

The present invention has an advantage that can provide a semiconductor memory apparatus, a memory access control system and a data reading method which can flexibly change the priority of reading requests when the reading request is issued and which do not exclusively use the memory bus.

In addition, the present invention has an advantage that can provide a semiconductor memory apparatus, a memory access control system and a data reading method which can prevent a control circuit from being large.

DETAILED DESCRIPTION OF THE INVENTION

Figure 1:
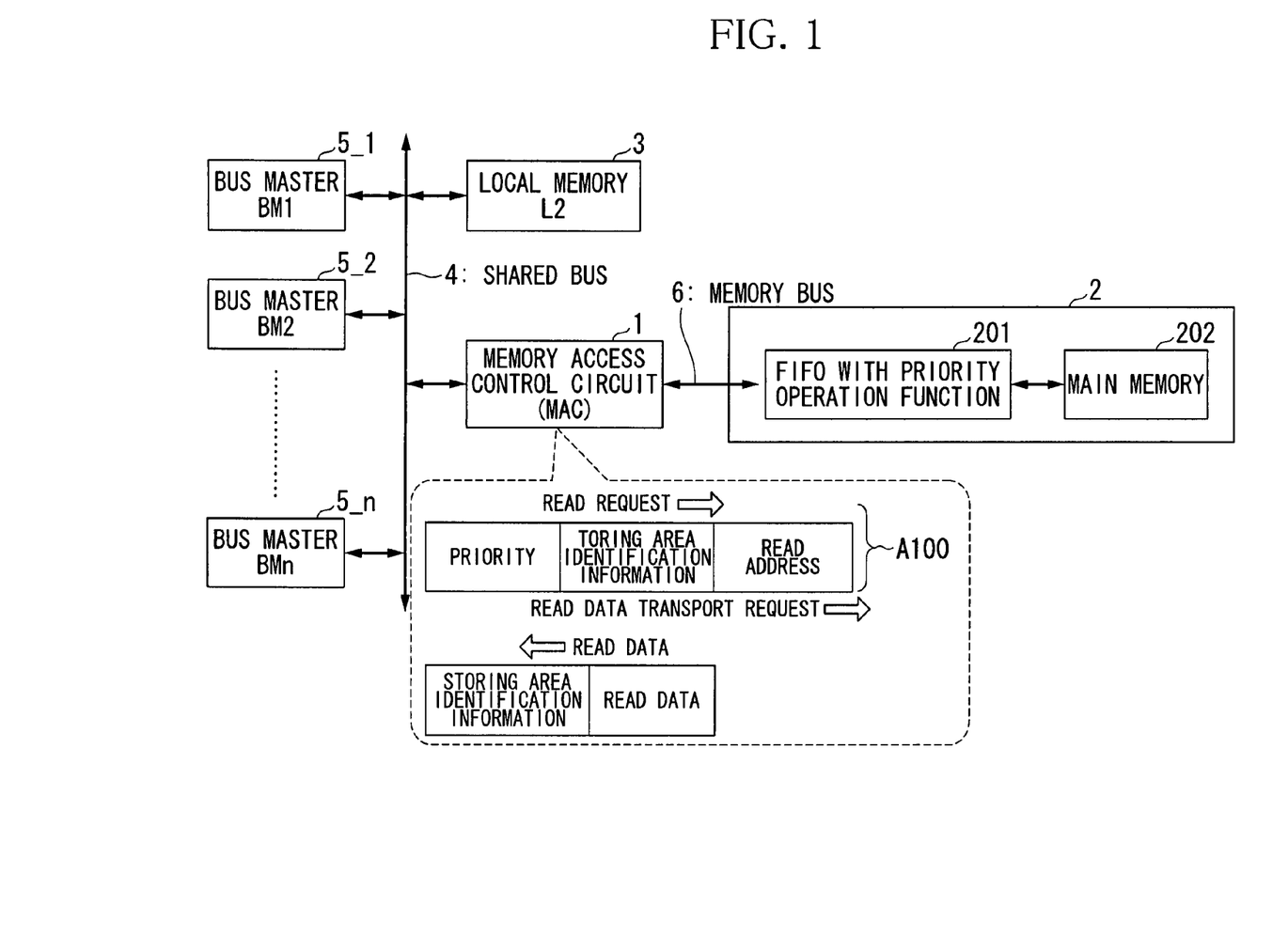
FIG. 1 is a block diagram which shows a constitution of a memory access control system of one embodiment.

Hereinafter, in reference to the drawings, one embodiment is explained. FIG. 1 is an outline block diagram which shows the constitution of a memory access control system of one embodiment. The memory access control system has a constitution including: multiple bus masters $5\_1, 5\_2, \ldots, 5\_n$ (n is a natural number); a local memory 3 (storing area memory portion); a memory access control circuit 1 (hereinafter, MAC 1); a shared bus 4 which connects these constitutional elements each other; and a main memory system 2 (semiconductor memory apparatus) which is controlled by the MAC 1.

The bus master 5 outputs a read request to the MAC 1 via the shared bus 4, and the read request has corresponding information including: a read address which is referred to when data from the main memory system 2 is read; the priority for reading the data; data storing area identification information for indicating the area at which the read data is stored (see A100 of FIG. 1). Each of the bus masters 5 arbitrary determines a priority every time the read request is issued.

Each of the bus masters 5 connected to the shared bus 4 is uniquely identified by identification information. Here, identification numbers of the bus masters $5\_1, 5\_2, \ldots, 5\_n$ are BM(bus master)1, BM2, ..., BMn. The bus master 5 is, for example, a CPU including a single core or multiple cores, a DSP or a DMA (direct memory access) controller.

The local memory 3 (L2) is a memory portion such as a cache memory in which data and corresponding address are stored. The local memory 3 connected to the shared bus 4 is uniquely identified by the identification information. Here, the identification information of the local memory 3 is L2. In addition, in the following explanation, an address of the local memory 3 is an address of an area at which the data is stored.

The main memory system 2 is a semiconductor memory apparatus shared by the multiple bus masters 5 via the shared bus 4, the MAC 1 and the memory bus 6. The main memory system 2 includes both a FIFO (first in first out) with priority operation function 201 and a main memory 202. The data is stored in the main memory 202 so as to maintain a relationship between the data and a corresponding address. The FIFO with priority operation function 201 is connected to the MAC 1 via the memory bus 6. The FIFO with priority operation function 201 controls the main memory 202. The FIFO with priority operation function 201 is explained in detail later.

It should be noted that the main memory system 2 can be whether an external memory or an on-chip memory. It should be noted that it is possible that the main memory 202 be a L3 cache memory if there is an additional memory of a lower layer than the main memory 202.

Figure 2:
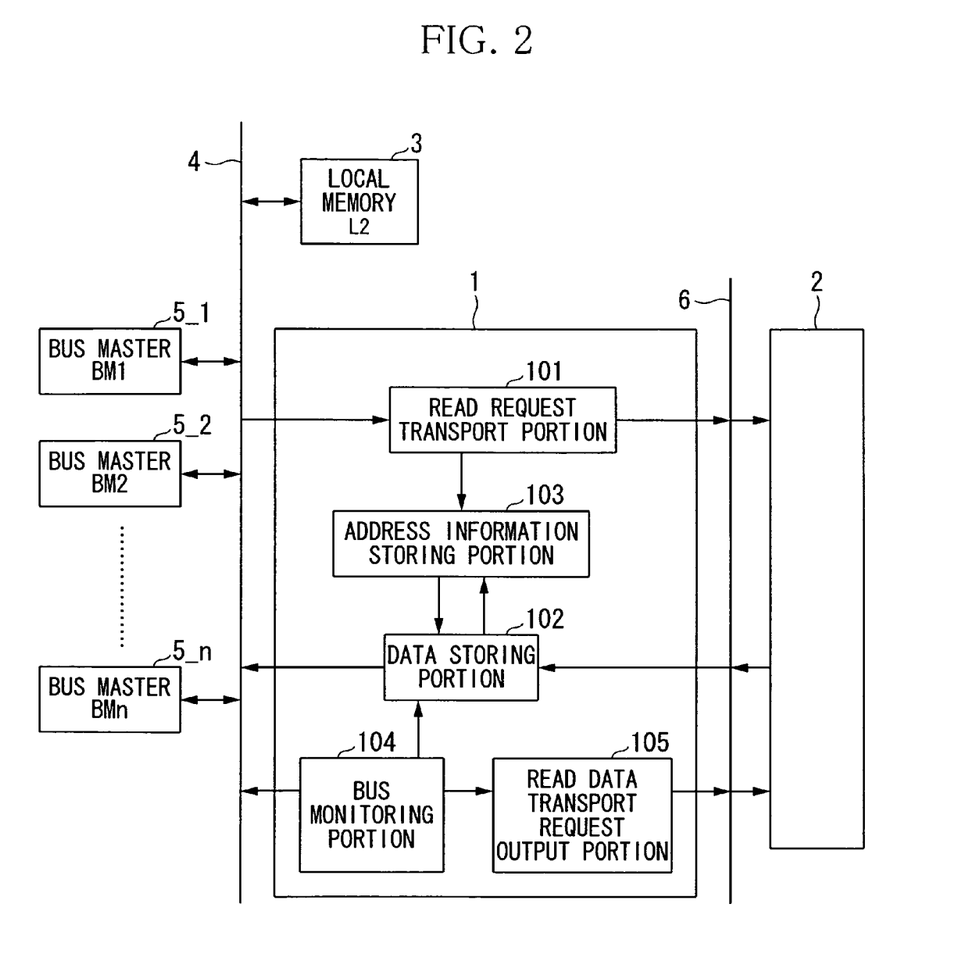
FIG. 2 is a block diagram which shows a constitution of MAC (memory access controller).

In reference to FIG. 2, a constitution of the MAC 1 is explained. In FIG. 2, the same reference numerals as FIG. 1 are assigned to corresponding portions of FIG. 1, and the explanations are omitted with regard to such corresponding portions included in FIG. 1. The MAC 1 includes: a read request transport portion 101; a data storing portion 102; an address information storing portion 103; a read data transport request output portion 105; and a bus monitoring portion 104. The address information storing portion 103 stores both a priority and an address at which data is stored while maintaining relationship between the priority and the address. The bus monitoring portion 104 monitors the shared bus 4 and outputs information of the shared bus 4 which is monitored to both the read data transport request output portion 105 and the data storing portion 102. The bus monitoring portion 104 monitors, for example, amount of data passing the shared bus 4.

The read request transport portion 101 inputs a read request from the bus master 5 via the shared bus 4 and outputs the read request to the main memory system 2 via the memory bus 6. In addition, if the data storing area identification information indicates the local memory 3 and the storing area identification information includes an address for storing data in the local memory 3, the read request transport portion 101 stores both the priority of the received read request and the address for storing data into the address information storing portion 103 while maintaining a relationship between the priority of the received read request and the address for storing data.

The data storing portion 102 inputs the read data and the storing area identification information from the main memory system 2 via the memory bus 6. Based on the storing area identification information, the data storing portion 102 stores the read data at an area which is indicated by the storing area identification information, that is, for example, the read data is stored at the bus master 5 which has the same identification information as the storing area identification information via the shared bus 4. It should be noted that the read data is read by the main memory system 2 based on a read address included in the read request.

The data storing portion 102 inputs the read data and the storing area identification information from the main memory system 2. If the storing area identification information indicates the local memory 3, the data storing portion 102 reads an address for storing data that has the highest priority from the address information storing portion 103, and stores the read data at the read storing address of the local memory 3.

The data storing portion 102 inputs both the read data and the storing area identification information from the main memory system 2, and stores the read data based on the storing area identification information in accordance with an inputting order of both the read data and the storing area identification information. Based on information from the bus monitoring portion 104 with regard to the amount of data, the data storing portion 102 stores the read data based on the storing area identification information if the shared bus 4 is not busy transmitting the data.

The read data transport request portion 105 transmits a read data transport request signal to the main memory system 2 via the memory bus 6 in order to request for outputting the read data. In addition, the read data transport request portion 105 monitors the read request transmitted from the read request transport portion 101 to the main memory system 2 via the memory bus 6. The read data transport request portion 105 transmits a read data transport request signal to the main memory system 2 via the memory bus 6 if the read request transport portion 101 does not transmit the read request. Based on information from the bus monitoring portion 104 with regard to the amount of data, read data transport request portion 105 transmits a read data transport request signal to the main memory system 2 if the shared bus 4 is not busy transmitting data.

Figure 3:
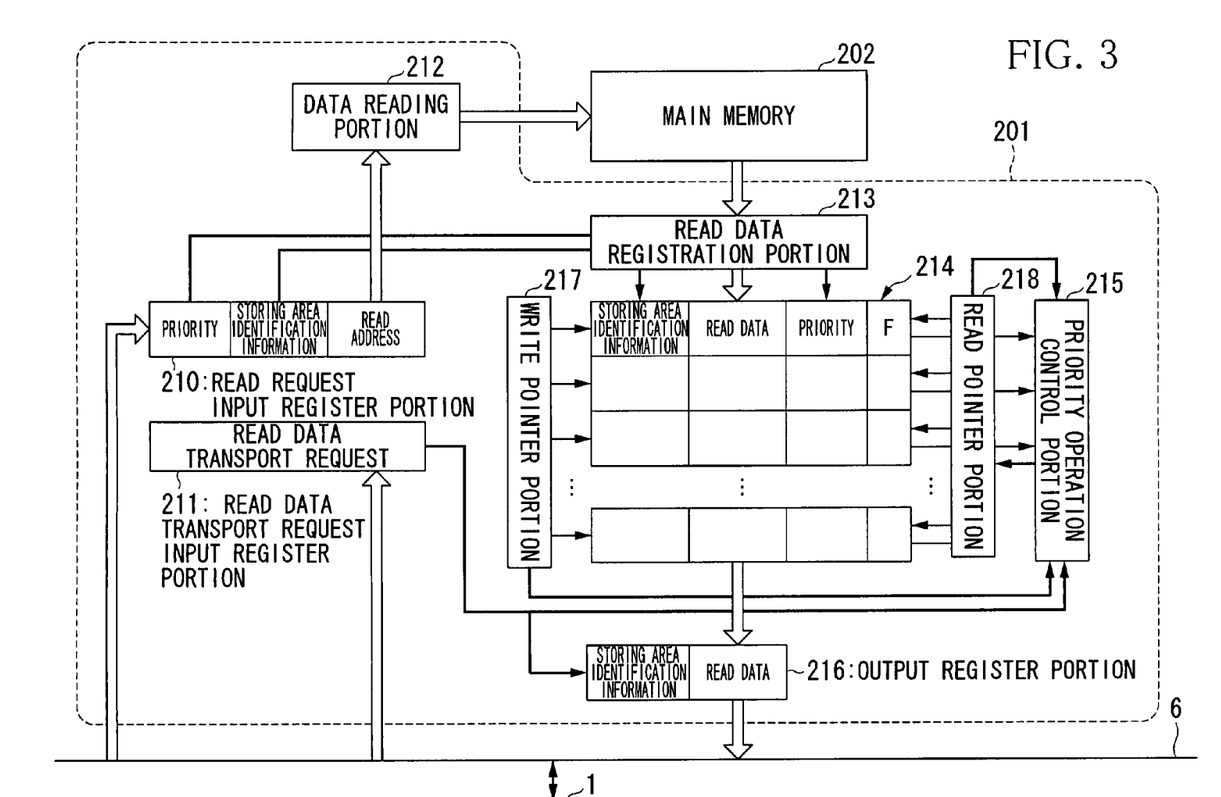
FIG. 3 is a block diagram which shows the constitution of a main memory system.

In reference to FIG. 3, a constitution of the FIFO with priority operation function 201 included in the main memory system 2. In FIG. 3, the same reference numerals as FIG. 1 or FIG. 2 are assigned to corresponding portions of FIG. 1 or 2, and the explanations thereof are omitted with regard to such corresponding portions included in FIG. 1 or 2.

The FIFO with priority operation function 201 includes: a read request input register portion 210 which inputs a read request from the MAC 1; a read data transport request input register portion 211 which inputs a data transport request signal from the MAC 1; and a register portion 214 including multiple registers for storing the storing area identification information, read data, priority and a read flag of the register (F) while maintaining a corresponding relationship between these data.

The FIFO with priority operation function 201 includes: a write pointer portion 217 which points a writing address of the register portion 214; a read pointer portion 218 pointing a reading address of the register portion 214; and an output register portion 216 which stores the read data and the storing area identification information while maintaining a corresponding relationship and which also outputs the read data and the storing area identification information to the MAC 1 via the memory bus 6.

In addition, the FIFO with priority operation function 201 includes: a data reading portion 212; a read data registering portion 213; and a priority operation control circuit 215 which reads both the data with the highest priority and the storing area identification information among the read data of the register portion 214 and stores both the read data with the highest priority and the storing area identification information to the output register portion 216.

The data reading portion 212 reads the data from the main memory 202 as the read data corresponding to the reading address included in the read request which is received by the read request input register portion 210. The read data which has been read by the data reading portion 212, a priority included in the read request received by the read request input register portion 210 and the storing area identification information are registered to the register portion 214 by the read data registering portion 213 while maintaining the corresponding relationship among them.

The read data registering portion 213 stores the read data, the priority and the storing area identification information by using a register pointed by the write pointer portion 217 while maintaining corresponding relationship among them. When the read data registering portion 213 stores the read data, priority and the storing area identification information by using a register pointed by the write pointer portion 217 while maintaining the corresponding relationship among them, the read data registering portion 213 registers the read flag (F) of an address which is pointed by the write pointer portion 217 as "unread".

The priority operation control circuit 215 chooses both the read data with the highest priority and the storing area identification information among the read data, priority and the storing area identification information that are stored in the register portion 214 while maintaining the corresponding relationship. The priority operation control circuit 215 stores both the chosen read data with the highest priority and the storing area identification information at the output register portion 216. That is, the priority operation control circuit 215 outputs both the chosen read data and the storing area identification information to the MAC 1 via the memory bus 6. In addition, when the read data transport request input register portion 211 inputs a read data transport request signal, the priority operation circuit 215 stores both the chosen read data with the highest priority and the storing area identification information at the output register portion 216, and consequently, the priority operation control circuit 215 outputs both the read data and the storing area identification information to the MAC 1 via the memory bus 6.

The priority operation control circuit 215 chooses the register with the highest priority among the registers which are included in the register portion 214 and which are between an address pointed by the write pointer portion 217 and an address pointed by the read pointer portion 218, and outputs both the read data and the storing area identification information stored in the chosen register. It should be noted that when the priority operation control circuit 215 chooses the register with the highest priority among the registers which are included in the register portion 214 and which are between an address pointed by the write pointer portion 217 and an address pointed by the read pointer portion 218, based on an address pointed by the write pointer portion 217, the priority operation control circuit 215 chooses the register with the highest priority among the registers between an address pointed by the read pointer portion 218 and an address which is one unit (such as one byte) next to an address pointed by the write pointer portion 217 in a direction from an address pointed by the write pointer portion 217 to an address pointed by the read pointer portion 218.

In addition, it should be noted that when the priority operation control circuit 215 chooses the register with the highest priority among the registers which are included in the register portion 214 and which are between an address pointed by the write pointer portion 217 and an address pointed by the read pointer portion 218, if the priority operation control circuit 215 detects multiple registers with both the same and the highest priority, the priority operation control circuit 215 chooses the register which is closest to the write pointer portion 217 among the multiple registers.

In addition, when the priority operation control circuit 215 chooses the register with the highest priority and outputs the read data stored in the chosen register, the priority operation control circuit 215 registers the read flag (F) of the chosen register with the highest priority as "read". When the priority operation control circuit 215 chooses the register with the highest priority, if the chosen register is the same address of the register portion 214 which is pointed by the read pointer portion 218, the priority operation control circuit 215 increments the address pointed by the read pointer portion 218 upon outputting the read data stored in the chosen register.

It should be noted that when the priority operation control circuit 215 chooses the register with the highest priority among the registers which are included in the register portion 214 and which are between an address pointed by the write pointer portion 217 and an address pointed by the read pointer portion 218, the priority operation control circuit 215 chooses the register with the highest priority and skipping the register if the read flag (F) corresponding to the register indicates "read". Such a skipping operation is, for example, ignoring the register if the read flag (F) corresponding to the register indicates "read".

An operation of the FIFO with priority operation function is explained. First, an operation of the FIFO with priority operation function in a case of receiving a read request from the MAC 1 is explained. The FIFO with priority operation function 201 inputs a read request, that is, the read request input register portion 210 of the FIFO with priority operation function 201 inputs the read request.

When the read request input register portion 210 inputs the read request, the read data registration portion 213 stores the priority information and the storing area identification information at the register of the register portion 214 pointed by the write pointer portion 217 while maintaining the corresponding relationship between the priority information and the storing area identification information. In addition, when the read request input register portion 210 inputs the read request, the data reading portion 212 reads the data corresponding to the read address of the read request from the main memory 202. The read data registration portion 213 stores the read data which has been read from the main memory 202 by the data reading portion 212, at the register of the register portion 214 pointed by the write pointer portion 217.

In other words, the register of the register portion 214 pointed by the write pointer portion stores the priority information of the read request from the MAC 1 that is input by the read request input register 210, the storing area identification information and the read data which correspond to the read address of the read request and which has been read from the main memory 202 while maintaining the corresponding relationship among these priority information, the storing area identification information and the read data. The read data registering portion 213 registers the read flag (F) as "unread", that is, the read data registering portion 213 resets the read flag (F), and increments the write pointer portion 217.

An operation of the FIFO with priority operation function 201 conducted after receiving a read data transport request signal from the MAC 1 is explained. The read data transport request input register portion 211 of the FIFO with priority operation function 201 inputs the read data transport request signal which has been received by the FIFO with priority operation function 201.

When the read data transport request input register portion 211 inputs the read data transport request signal, the priority operation control circuit 215 reads the storing area identification information and the read data in accordance with a descending order of priority among the read data stored in the registers of the register portion 214 between the register just before the register pointed or indicated by the write pointer portion 217 and the register pointed by the read pointer portion 218. The priority operation control circuit 215 stores the read data and the storing area identification information at the output register portion 216 while maintaining a corresponding relationship between the read data and the storing area identification information.

Here, the register just before the register pointed by the write pointer portion 217 is the register of an address which is one unit (such as one byte) next to an address pointed or indicated by the write pointer portion 217 in a direction from an address pointed by the write pointer portion 217 to an address pointed by the read pointer portion 218.

It should be noted that if the priority operation control circuit 215 detects multiple sets of the read data and the storing area identification information with the same priority, the priority operation control circuit 215 selects the read data and the storing area identification information that are stored in the register closer to an address pointed by the write pointer than other data and outputs the read data and the storing area identification information to the output register portion 216. The output register portion 216 transports the read data and the storing area identification information to the MAC 1 via the memory bus 6. In the above-described operation, when the priority operation control circuit 215 selects the read data and the storing area identification information stored in the register of the register portion 214 pointed by the read pointer portion 218 and outputs the data to the output register portion 216, the priority operation control circuit 215 increments a value stored in the read pointer portion 218. If the priority operation control circuit 215 selects the read data and the storing area identification information that are stored in other register than the register pointed by the read pointer portion 218 and outputs the read data and the storing area identification information to the output register portion 216, the priority operation control circuit 215 updates the corresponding read flag (F) of the register portion 214 as "read".

After the priority operation control circuit 215 has received the read data transport request signal from the MAC 1, in an operation in which the priority operation control circuit 215 reads the storing area identification information and the read data in accordance with a descending order of priority among the read data stored in the registers of the register portion 214 between the register just before the register pointed by the write pointer portion 217 and the register pointed by the read pointer portion 218, the priority operation control circuit 215 ignores the register if a corresponding read flag (F) indicates "read" from a searching scope. That is, such the register is skipped. Therefore, the register of the register portion 214 corresponding to a read flag (F) which has been set as "read" by setting the flag "on" is not recognized by the priority operation control circuit 215 as the register included in a searching scope, that is, such the register is skipped until the read flag (F) is reset when the read data registration portion 213 reads the read data from the main memory 202 and stores the read data at the register. By applying the read flag (F), the priority operation control circuit 215 can quickly select the register with the highest priority among registers of the register portion 214.

Figure 4:
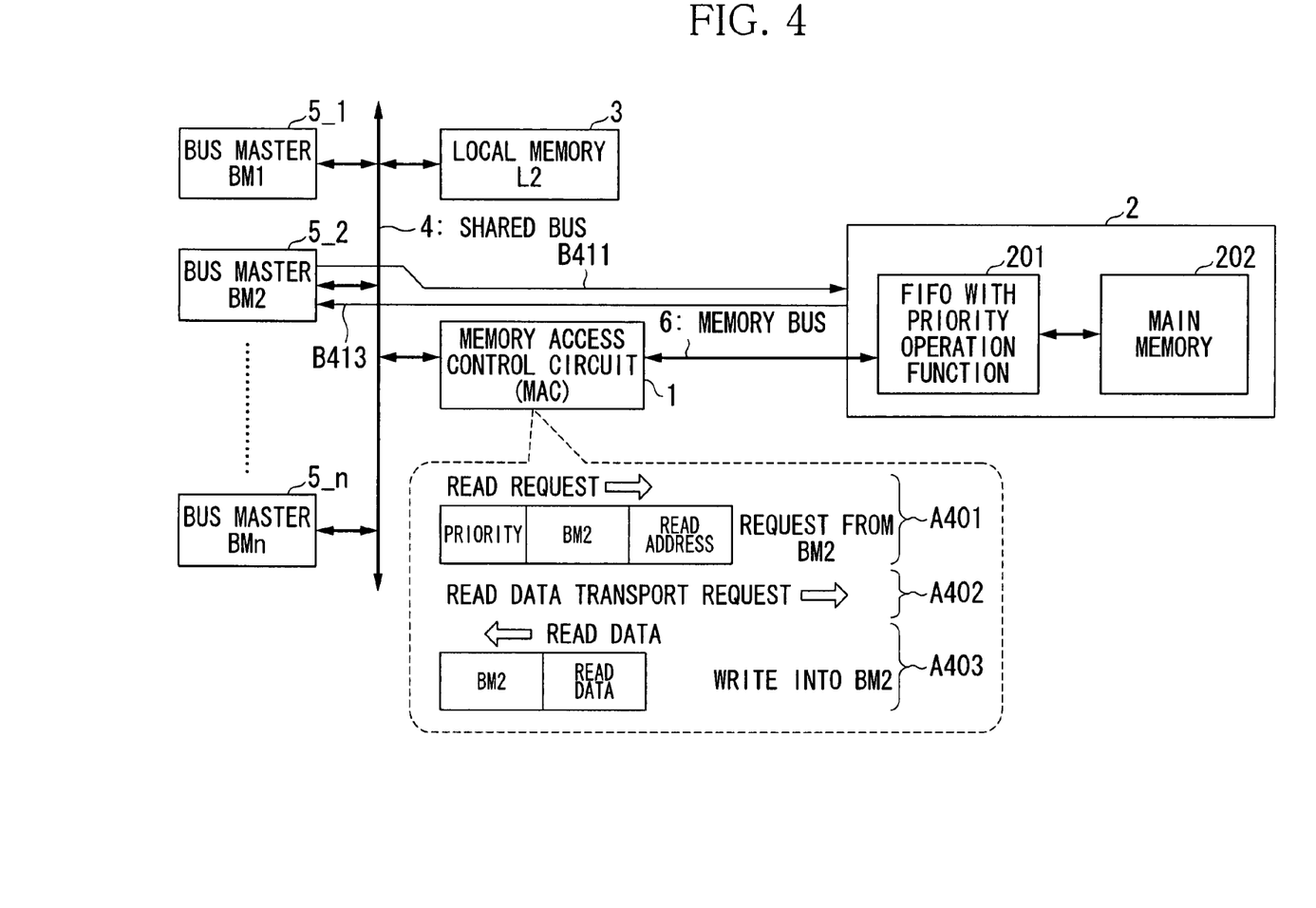
FIG. 4 is a drawing explaining a first example of operation of a memory access control system.
Figure 5:
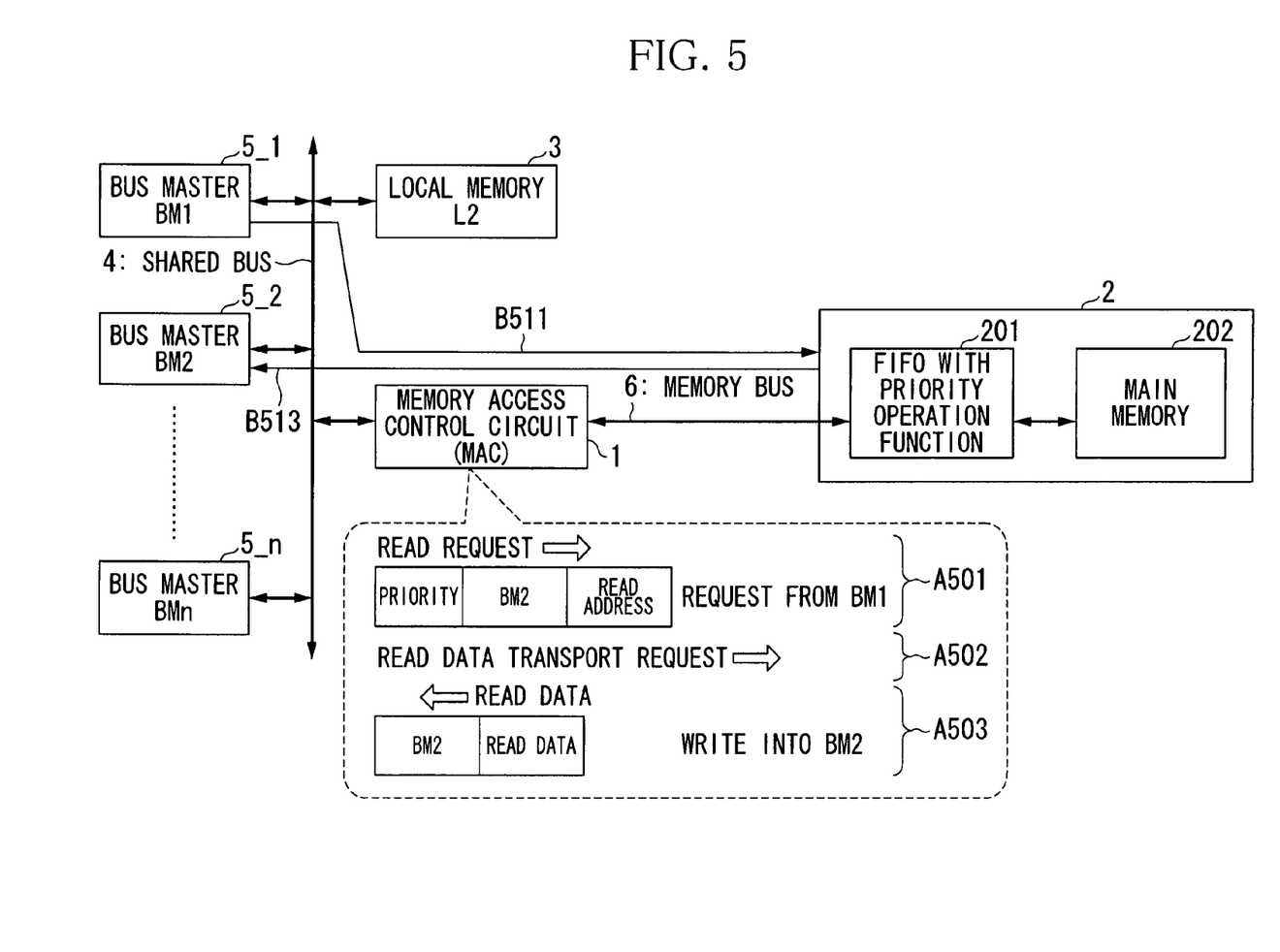
FIG. 5 is a drawing explaining a second example of operation of a memory access control system.
Figure 6:
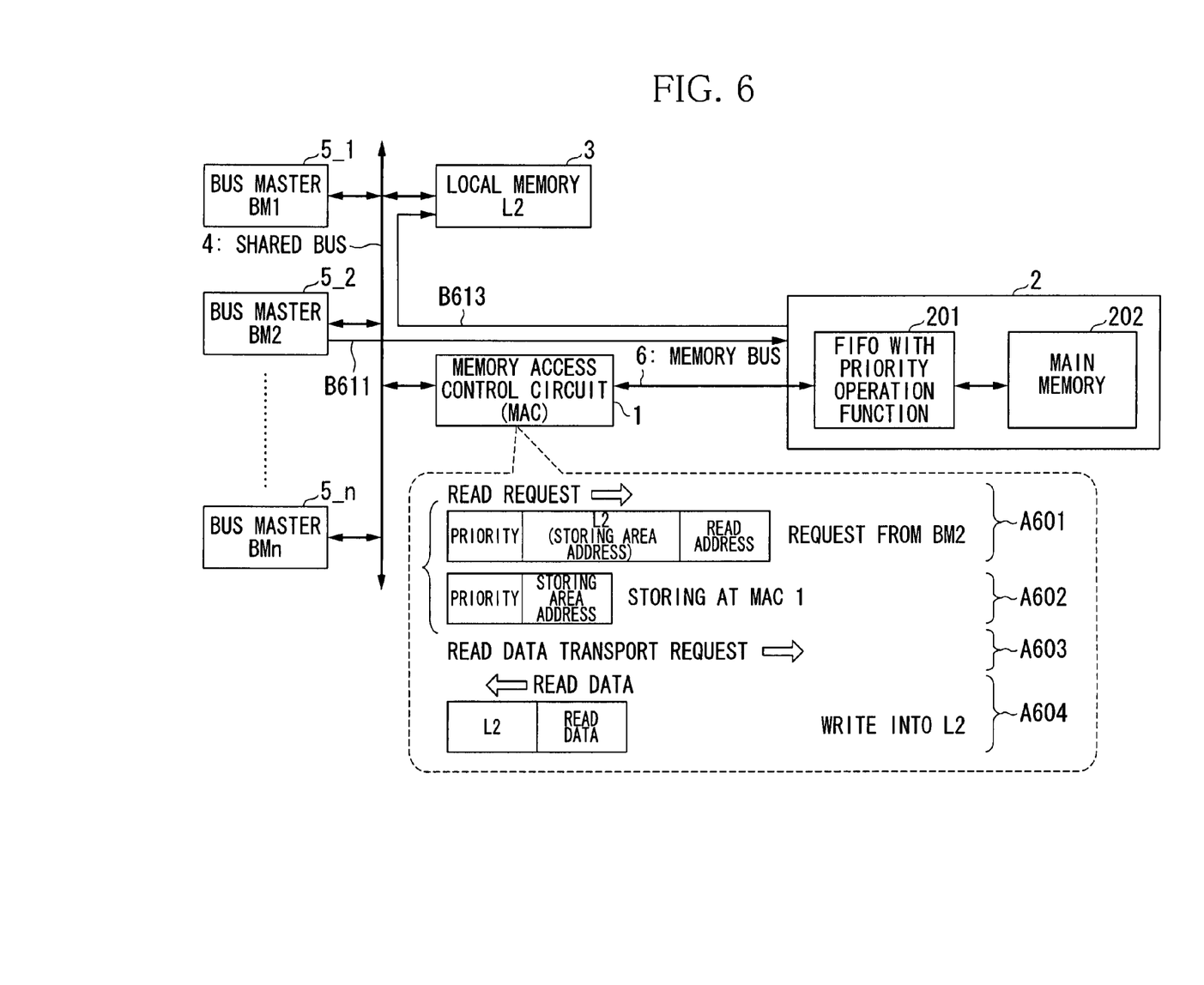
FIG. 6 is a drawing explaining a third example of operation of a memory access control system.

In reference to FIGS. 4-6, three operation examples of the memory access control system are explained. In FIGS. 4-6, the same reference numerals as FIGS. 1-3 are assigned to corresponding portions, and the explanations thereof are omitted with regard to such corresponding portions.

OPERATION EXAMPLE 1

Bus Master 5_2 Sets an Address as Bus Master 5_2

FIG. 4 shows a concrete example of the contents of a read request, the storing area identification information, the read data and a transmission path of the read data in a case in which the bus master 5_2 sets the storing area identification information as "BM2" which is an identification number of the bus master 5_2 and transmits a read request to the main memory 202.

First, the bus master 5_2 sets the storing area identification information of a read request as "BM2" and transmits (B411) the read request (A401) to the MAC 1. The MAC 1 transmits the read request (A401) to the main memory system 2. The MAC 1 transmits a read data transport request signal (A402) to the main memory system 2. In order to respond to the read data transport request signal (A402), the main memory system 2 transmits both the read data and "BM2" (A403) which is the storing area identification information to the MAC 1. After receiving both the read data and "BM2" (A403) which is the storing area identification information, the MAC 1 transmits the read data to the bus master 5_2 based on "BM2" which is the storing area identification information (B413).

As explained in FIG. 4, MAC 1 stores read data in accordance with an order of receiving the read data from the main memory system 2. In such a case, an operation of the MAC 1 is simple, and the size of circuits which constitute the MAC 1 can be small.

OPERATION EXAMPLE 2

Bus Master 5_1 Sets an Address as Bus Master 5_2

FIG. 5 shows an example in which the read data is transmitted in a different path from FIG. 4. FIG. 5 shows a concrete example of the contents of a read request, the storing area identification information, read data and a transmission path of the read data in a case in which the bus master 5_1 sets the storing area identification information as "BM2" which is an identification number of the bus master 5_2 and transmits a read request to the main memory 202.

First, the bus master 5_1 sets the storing area identification information of a read request as "BM2" and transmits (B511) the read request (A501) to the MAC 1. The MAC 1 transmits the read request (A501) to the main memory system 2. The MAC 1 transmits a read data transport request signal (A502) to the main memory system 2. In order to respond to the read data transport request signal (A502), the main memory system 2 transmits both the read data and "BM2" (A503) which is the storing area identification information to the MAC 1. After receiving both the read data and "BM2" (A503) which is the storing area identification information, the MAC 1 transmits the read data to the bus master 5_2 based on "BM2" which is the storing area identification information (B513).

As explained by referring to FIG. 5, the bus master 5_1 transmits the read request, and the data is stored at the bus master 5_2. In this case, in the same manner as described above, the bus master 5_1 transmits a read request including a corresponding relationship between priority and "BM2" which is the storing area identification information to the MAC 1. After this, by applying the memory access control system, the read data from the main memory system 2 is stored at the bus master 5_2.

OPERATION EXAMPLE 3

Bus Master 5_2 Sets an Address as Local Memory 3

FIG. 6 shows a concrete example of contents of a read request, contents of both storing area identification information and read data and a transmission path of the read data in a case in which the bus master 5_2 sets the storing area identification information as "L2" which is an identification number of the local memory 3 and transmits a read request to the main memory 202. In reference to FIG. 6, an operation of the memory access control system is explained in which the bus master 5_2 transmits a read request to the main memory 202, and the read data is stored in the local memory 3.

First, the bus master 5_2 sets the storing area identification information of a read request as "L2" and transmits (B611) the read request (A601) to the MAC 1. It should be noted that this read request (A601) includes a storing area address which indicates an address of the local memory 3. The MAC 1 transmits the read request (A601) to the main memory system 2. Here, the MAC 1 stores both the storing area address and priority at the address information storing portion 103 inside the MAC 1 while maintaining a corresponding relationship (A602) between the storing area address and priority.

The MAC 1 transmits a read data transport request signal (A603) to the main memory system 2. In order to respond to the read data transport request signal (A603), the main memory system 2 transmits both the read data and "L2" (A604) which is the storing area identification information to the MAC 1. After receiving both the read data and "L2" (A604) which is the storing area identification information, the MAC 1 reads the storing area address of the highest priority from the address information storing portion 103 inside the MAC 1 based on the storing area identification information which is "L2" and stores the read data at the storing area address of the local memory 3 indicated by the storing area identification information which is "L2" (B613).

As explained by referring to FIG. 6, when the bus master 5_2 transmits a memory access request to the MAC 1, the bus master 5_2 transmits a read request to the MAC 1, and the read request includes a corresponding relationship of the storing area identification information which is identification information (L2) indicating the local memory 3, a storing area address of the local memory 3, priority and a read address for reading data from the main memory 202. The MAC 1 outputs a read request to the main memory system while the read request includes a corresponding relationship of the identification information indicating the local memory 3, priority and a read address of the main memory 202, and stores both the priority and the storing area address of the local memory 3 at the address information storing portion 103 while maintaining a corresponding relationship between the priority and the storing area address of the local memory 3.

After this, the MAC 1 outputs the read data transport request signal to the main memory system 2, and receives the read data together with the storing area identification information. If the storing area identification information transmitted with the read data indicates the local memory 3, a storing area address with the highest priority included in the address information storing portion 103 of the MAC 1 is selected, and the read data is stored at the selected storing area address. It should be noted that if the MAC 1 detects multiple storing areas with the same and the highest priority, the MAC1 stores the read data at the storing area which was stored first at the address information storing portion 103.

SUMMARY OF OPERATION OF THE EMBODIMENT

The memory access control system of the above-described embodiment has a constitution in which a read request from the MAC 1 to the main memory system 2 includes priority, the storing area identification information and the read address of the main memory 202 that can be changed every time the bus master 5 issues the read request to the MAC 1.

After receiving the read request from the MAC 1, the main memory system 2 reads the corresponding data as the read data from the main memory 202 and stores the read data, priority and the storing area identification information at the FIFO with priority operation function 201 while maintaining a corresponding relationship among the read data, priority and the storing area identification information. After this, when the MAC 1 transmits the read data transport request to the main memory system 2, the main memory system 2 refers to priority of the read data stored in the FIFO with priority operation function 201 and transmits the read data and the corresponding storing area identification information to the MAC 1 while maintaining a corresponding relationship between the read data and the corresponding storing area identification information.

It should be noted that if the main memory system 2 detects multiple sets of the read data with the same priority, the main memory system 2 outputs the read data to the MAC 1 in accordance with an order in which the read data has been read from the main memory 202 and stored by the FIFO with priority operation function 201. Here, information of the priority is not necessary with regard to the read data which is transmitted to the MAC 1 by the main memory system 2. After receiving the read data from the main memory system 2, the MAC 1 stores the read data at the storing area indicated by the storing area identification information which has been transmitted with the read data in accordance with an order to receive the read data from the main memory system 2, and all of the memory access operation is finished.

In accordance with the above-described description, if the above-described embodiment is applied to a system which conducts a parallel information processing by using a multi-core CPU, with regard to reading requests to access the shared main memory 202, it is possible to set the priority of each of the reading requests and to access the main memory 202 without difficulties in order to transmit and process the data at a preferable time. Consequently, it is possible to obtain an advantage to improve an overall ability of the information processing system.

In addition, the MAC 1 can transmit the data transport request signal to the main memory system 2 at a time which does not conflict with other read requests for reading data from the main memory system 2.

In addition, in the memory access control system, by applying the above-described constitution and operation, both the MAC 1 and the main memory system 2 which is constituted from the FIFO with priority operation function 201 and the main memory 202 can share a priority operation control of accessing the memory. Therefore, operations of both the MAC 1 and the main memory system 2 are comparatively simple.

For example, in an operation regarding a read request from the MAC 1, the read request input via the bus master 5 is simply transported to the main memory system 2. In addition, regarding an operation of transporting read data of the MAC 1, the read data is simply transmitted to the storing area identified by the storing area identification information in accordance with an order of receiving both the storing area identification information and the read data input from the main memory system 2. Therefore, an operation of the MAC 1 is simple.

In addition, for example, information which is output from the main memory system 2 and which is received by the data storing portion 102 of the MAC 1 includes the storing area identification information and the read data. That is, the information of priority is not included. This is because an operation regarding priority has been conducted by the main memory system 2, and the MAC 1 does not conduct an operation regarding priority. Therefore, an operation of the MAC 1 is simple.

As described above, a control of reading data from the main memory system 202 based on priority is shared and divided by both the MAC 1 and the main memory system 2, and controlling operations of both the MAC 1 and the main memory system 2 are comparatively simple. Therefore, it is possible to achieve low electric power for using the MAC 1, to achieve small size of a circuit of the MAC 1 and to achieve a small size of an area of a chip of the MAC 1.

In addition, in accordance with the above-described embodiment, in a memory access control method for replying read data from the main memory system 2 based on the read request from the control circuit (MAC 1) which controls memory access operations, even if the priorities of read requests from the multiple bus masters 5 are different than each of the read requests or each of the bus masters 5, the main memory system 2 replies the read data in descending order of priority based on the different priorities. Therefore, it is possible to optimize efficiency of usage of the memory bus 6 and improve the overall ability of the system.

In an explanation of the above-described embodiment, when the read data transport request input register portion 211 inputs the read data transport request signal, the priority operation control circuit 215 outputs both the read data and the storing area identification information. However, this is not a limitation. For example, the priority operation control circuit 215 can monitor the memory bus 6 and can output the read data and the storing area identification information if there is a vacancy in the memory bus 6 for transmitting data. Otherwise, for example, there can be a timer function for measuring time inside the priority operation control circuit 215, and the read data and the storing area identification information can be output every certain time measured by the timer function. In such cases, it should be noted that the priority operation control circuit 215 outputs the read data and the storing area identification information based on priority in a similar manner as in the above-described embodiment.

In the above-described embodiment, only a case of the local memory 3 which is used as the storing area memory portion is explained. However, this is not a limitation. It is possible to use any portion as the storing area memory portion if the portion can be uniquely identified based on the storing area identification information and have an interface which can be detected based on an address that indicates a location for inputting data. One example of such a storing area memory portion other than the local memory 3 is an I/O (Input/Output) portion.

In the explanation of the above-described embodiment, the main memory system 2 includes both the FIFO with priority operation function 201 and the main memory 202. However, this is not a limitation. It is possible to apply the constitution in which the FIFO with priority operation function 201 and the main memory 202 are integrated, and it is possible to apply the constitution in which the FIFO with priority operation function 201 and the main memory 202 are independently provided.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

There are various cases to which the present invention is applied. One example is a computer system in which a multi-core CPU is included, and information processing operation is conducted in parallel. In addition, for example, it is possible to apply the present invention to a main memory system in which data is transported to the register.

What is claimed is:

1. A semiconductor memory apparatus, comprising:
    a main memory which stores data at an address while maintaining a corresponding relationship between the data and the address;
    a read request input portion receiving a read request which maintains a corresponding relationship between address information that is referred to when reading the data and priority information that indicates priority for reading the data;
    a read data storing portion which stores both the data and the priority information while maintaining a corresponding relationship between the data and the priority information;
    a data reading portion which reads the data corresponding to the address information which is input by the read request input portion from the main memory;
    a read data registration portion storing both the priority information input by the read request input portion and the data read by the data reading portion to the read data storing portion while maintaining a corresponding relationship between the priority information and the data read; and
    a priority operation control portion which chooses the data with a highest priority among the priority information and the data that are stored in the read data storing portion, and outputs the chosen data, while maintaining a corresponding relationship between the priority information and the data.

2. A semiconductor memory apparatus according to claim 1, further comprising a read data transport request input portion which receives a data transport request signal requesting to output the data, wherein
    the priority operation control portion chooses the data with the highest priority when the read data transport request portion receives the read data transport request.

3. A semiconductor memory apparatus according to claim 1, wherein the read data storing portion comprises:
    a plurality of registers which store both the data and the priority information while maintaining a corresponding relationship between the data and the priority information;
    a read pointer portion which indicates a read address of the plurality of registers; and
    a write pointer portion which indicates a write address of the plurality of registers;
    the read data registration portion stores the priority information and the data to the register pointed by the address indicated by the write pointer portion while maintaining a corresponding relationship between the priority information and the data, and
    the priority operation control portion chooses the register with a highest priority among the registers between the address pointed by the write pointer portion and the address pointed by the read pointer portion and reads the data stored in the chosen register.

4. A semiconductor memory apparatus according to claim 3, wherein when the priority operation control portion chooses the register with the highest priority among the registers between the address pointed by the write pointer portion and the address pointed by the read pointer portion and reads the data stored in the chosen register, if the priority operation control portion detects a plurality of registers with the highest priority, the priority operation control portion chooses one of the multiple registers that is closest to the address pointed by the write pointer portion.

5. A semiconductor memory apparatus according to claim 3, wherein each of the registers store a read flag which indicates whether or not the register has been read while maintaining a corresponding relationship between the flag and the priority information,
    the read data registration portion sets the read flag of the register corresponding to the address pointed by the write pointer portion to "unread" when the read data registration portion stores the priority information and the data to the register pointed by the address indicated by the write pointer portion while maintaining a corresponding relationship between the priority information and the data, and
    the priority operation control portion sets the read flag of the register with the highest priority to "read" when the priority operation control portion chooses the register with a highest priority and outputs the data stored in the chosen register.

6. A semiconductor memory apparatus according to claim 5, wherein when the priority operation control portion chooses the register with the highest priority among the registers between the address pointed by the write pointer portion and the address pointed by the read pointer portion and reads the data stored in the chosen register, the priority operation control portion skips the register if the read flag of the register is "read".

7. A semiconductor memory apparatus according to claim 1, wherein the read request comprises storing area identification information which indicates a storing area at which the data which has been read is stored
corresponding relationships are maintained between the storing area identification information and the address information and between the storing area identification information and the priority information,
the data, the priority information and the storing area identification information are stored at the read data storing portion
the read data registration portion stores the priority information input by the read request input portion, the priority information, the storing area identification information and the data read by the data reading portion at the read data storing portion while maintaining a corresponding relationship thereof, and
the priority operation control portion chooses and outputs the priority information, the storing area identification information and the data while maintaining a corresponding relationship thereof that have the highest priority and have been stored at the read data storing portion while maintaining a corresponding relationship thereof.

8. A semiconductor memory apparatus according to claim 1, wherein the read data storing portion comprises a plurality of registers, the data and the priority information being stored in the plurality of registers.

9. A semiconductor memory apparatus according to claim 8, wherein the plurality of registers includes a register which stores a read flag which indicates whether the register has been read.

10. A semiconductor memory apparatus according to claim 8, wherein the read data storing portion further comprises a read pointer portion which indicates a read address of the plurality of registers, and a write pointer portion which indicates a write address of the plurality of registers.

11. A semiconductor memory apparatus according to claim 10, wherein the read data registration portion stores the priority information and the data to a register in the plurality of registers which is pointed by the address indicated by the write pointer portion while maintaining a corresponding relationship between the priority information and the data.

12. A semiconductor memory apparatus according to claim 10, wherein the priority operation control portion chooses a register with a highest priority among the plurality of registers between the address pointed by the write pointer portion and the address pointed by the read pointer portion and reads the data stored in the chosen register.

13. A semiconductor memory apparatus according to claim 12, wherein the memory apparatus is shared by a plurality of bus masters via a shared bus, a memory access control circuit (MAC) and a memory bus.

14. A semiconductor memory apparatus according to claim 13, wherein the priority operation control circuit outputs the chosen data and the storing area identification information to the MAC via the memory bus.

15. A semiconductor memory apparatus according to claim 13, further comprising:
an output register portion which stores the chosen read data with the highest priority and the storing area identification information while maintaining a corresponding relationship, and outputs the chosen read data and the storing area identification information to the MAC via the memory bus.

16. A memory access control system which reads data from a semiconductor memory apparatus via a memory access control circuit, wherein the memory access control circuit inputs a read request including: address information which is referred to when the data is read from the semiconductor memory apparatus; priority information which indicates priority of reading the data; and storing area identification information which is used for determining a storing area of the read data while maintaining a corresponding relationship thereof, and comprises a read request transport portion which outputs the read request that has been input,
the semiconductor memory apparatus comprises:
a main memory which stores data at an address while maintaining a corresponding relationship between the data and the address;
a read data storing portion which stores the data, priority, and storing area identification information while maintaining a corresponding relationship thereof;
a read request input portion receiving a read request from the memory access control circuit;
a data reading portion reads the data corresponding to address information included in the read request which is input by the read request input portion from the main memory;
a read data registration portion storing the priority information input by the read request input portion, the data read by the data reading portion and the storing area identification information to the read data storing portion while maintaining a corresponding relationship thereof; and
a priority operation control portion which chooses the data and the storing area identification information with a highest priority among the data, the priority and the storing area identification information stored in the read data storing portion and outputs the data and the storing area identification information to the memory access control portion while maintaining a corresponding relationship thereof, and
the memory access control circuit comprises a data storing portion which inputs the data and the storing area identification information from the semiconductor memory apparatus while maintaining a corresponding relationship thereof and stores the data based on the storing area identification information.

17. A memory access control system according to claim 16, wherein the memory access control circuit comprises a read data transport request output portion which outputs a read data transport request signal which requests to output the data to the semiconductor memory apparatus,
the semiconductor memory apparatus comprises a read data transport request input portion which receives a data transport request signal from the memory access control circuit, and
the priority operation control portion outputs the data and the storing area identification information to the memory access control circuit when the read data transport request portion receives the read data transport request.

18. A memory access control system according to claim 16, wherein the data storing portion inputs the data and the storing area identification information from the semiconductor memory apparatus and stores the data based on the storing area identification information in an order of inputting the data and the storing area identification information.

19. A memory access control system according to claim 16, wherein the memory access control system comprises a storing area memory portion which stores the data while maintaining a corresponding relationship between the data and a storing area address,
   the memory access control circuit comprises an address information storing portion for storing the priority and the storing address while maintaining a corresponding relationship thereof,
   the read request transport portion stores the priority and the storing address at the address information storing portion while maintaining a corresponding relationship thereof if the storing area identification information of the read request indicates the storing area memory portion and the storing area address is included in the storing area identification information,
   if the data storing portion inputs the data and the storing area identification information from the semiconductor memory apparatus and the storing area identification information indicates the storing area memory portion, the data storing portion reads the storing area address with the highest priority from the address information storing portion and stores the data at the storing area memory portion of the storing area address.

20. A data reading method of a semiconductor memory apparatus which includes a main memory that stores data while maintaining a corresponding relationship between the data and an address, comprising:
   a step of inputting a read request including both address information which is referred to when reading the data and priority information which indicates priority for reading the data while maintaining a corresponding relationship thereof;
   a step of reading the data corresponding to the address information from the main memory;
   a step of storing the read data and the priority information at a read data memory portion which stores the data and the priority information while maintaining a corresponding relationship thereof; and
   a step of choosing the data with a highest priority among the data and the priority information stored in the read data memory portion, and outputting the chosen data.

* * * * *